United States Patent [19]

Furumura et al.

[11] Patent Number: 4,486,026
[45] Date of Patent: Dec. 4, 1984

[54] SEALING AND BEARING MEANS BY USE OF FERROFLUID

[75] Inventors: Kyozaburo Furumura, Ninomiya; Hiromi Sugi, Fujisawa; Yasuo Murakami, Fujisawa; Hiromitsu Asai, Fujisawa, all of Japan

[73] Assignee: Nippon Seiko K.K., Tokyo, Japan

[21] Appl. No.: 463,572

[22] Filed: Feb. 3, 1983

[30] Foreign Application Priority Data

Feb. 10, 1982 [JP] Japan .................................. 57-18840
Feb. 10, 1982 [JP] Japan .................................. 57-18841
Feb. 10, 1982 [JP] Japan .................................. 57-18842

[51] Int. Cl.³ .......................... F16J 15/16; F16J 15/40
[52] U.S. Cl. ..................... 277/80; 277/96.1; 277/133
[58] Field of Search ................. 277/134, 133, 80, 135, 277/96.1, 96.2

[56] References Cited

U.S. PATENT DOCUMENTS

| | | | |
|---|---|---|---|
| 4,293,137 | 10/1981 | Ezekiel | 277/80 |
| 4,304,411 | 12/1981 | Wilcock | 277/80 |
| 4,335,885 | 6/1982 | Heshmat | 277/80 |
| 4,407,518 | 11/1983 | Moskowitz | 277/80 |

Primary Examiner—Robert I. Smith
Attorney, Agent, or Firm—Louis E. Marn

[57] ABSTRACT

This invention relates to sealing and bearing means by use of ferrofluid, in which a magnet is utilized effectively in cooperation with grooves engraved on one surface thereof, the grooves having the function for generating the dynamic pressure of the ferrofluid. The ferrofluid is retained in a gap between a rotary shaft and a magnet of cylindrical or disc type enclosing the rotary shaft concentrically. The magnet performs excellent two functions of bearing and sealing respectively.

9 Claims, 36 Drawing Figures

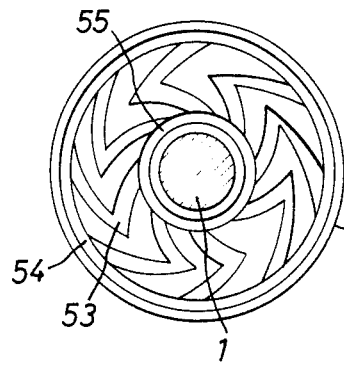
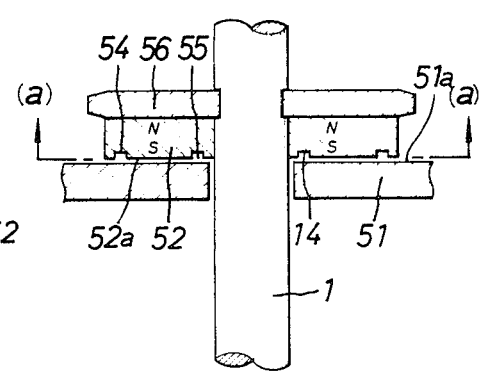
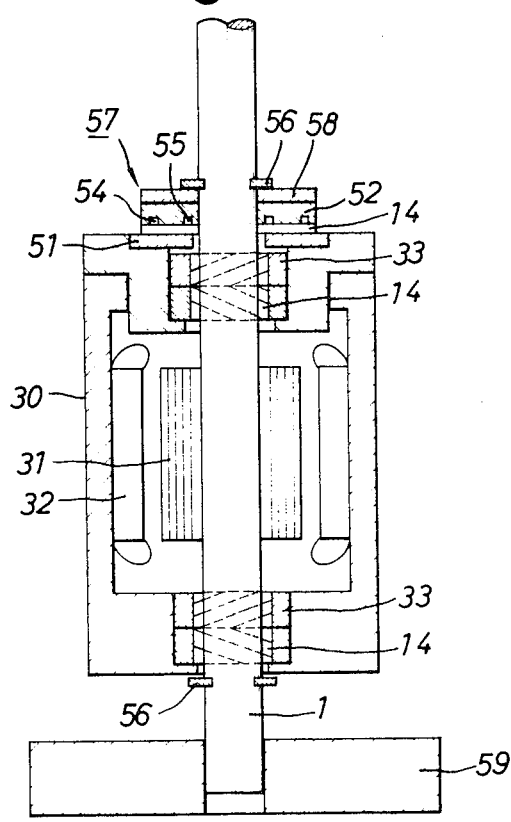

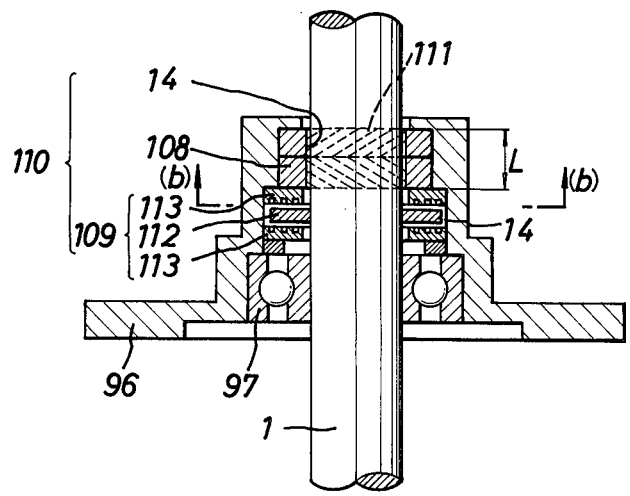
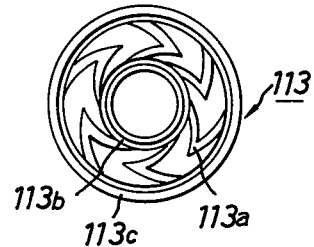
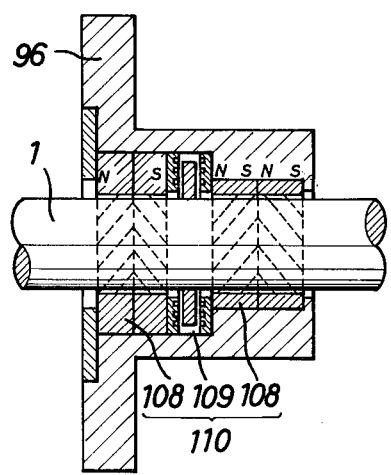
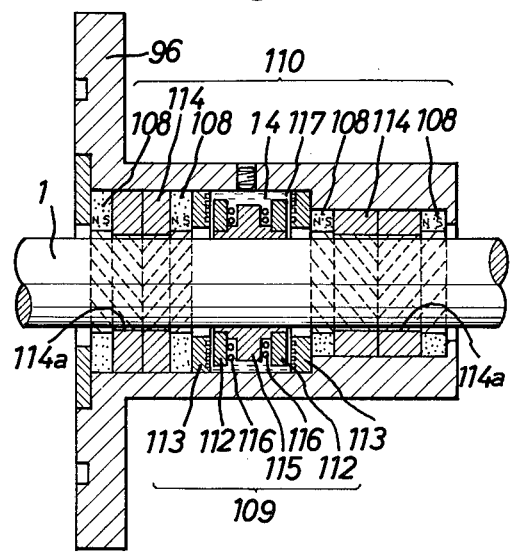

SEALING AND BEARING MEANS BY USE OF FERROFLUID

BACKGROUND OF THE INVENTION

This invention relates to sealing and bearing means by use of ferrofluid which is suitable for rotary means requiring low noises and high accuracy.

First of all, a principle of the conventional sealing and bearing means by use of ferrofluid will be described with reference to FIG. 1. Numeral 1 is a rotary shaft and numeral 2 is a cylindrical magnet for enclosing the rotary shaft 1 concentrically. The cylindrical magnet 2 is provided, at its both ends 2a and 2b, with a flange having openings 3 and 4 for passing the rotary shaft 1. Numerals 5 and 6 are gaps for sealing, which are formed between the faces of the openings 3 and 4 and the surface of the rotary shaft 1. Numeral 7 is a ferrofluid filled inside the magnet 2, which is retained upon the overall surface of the rotary shaft 1 by means of attraction of magnetic flux formed concentratedly within the gaps 5 and 6. Numeral 8 is a housing. The both ends 2a and 2b are composed of pole pieces made of a ferromagnetic soft steel for attracting magnetic flux. Further, a cylindrical member 9 having grooves for generating the dynamic pressure of the ferrofluid is fixed with an surface of the rotary shaft 1. Further, in order to center the rotary shaft 1 by exerting effectively the dynamic pressure generated by rotation of the shaft 1, to prevent any damage of the shaft 1 in contacting with the magnet 2 and to promote an effective magnetic sealing, it is required to fix a cylindrical center member 10 consisting of a non-ferromagnetic material upon the interior of the magnet 2. The structure of such a conventional sealing and bearing means will be illustrated more fully in FIG. 2 where a thrust/radial bearing is shown.

Since the same construction as shown in FIG. 1 has the same numerals, its description will be omitted.

The housing 8 supports the magnet 2 and the pole pieces 2a and 2b by means of clamping nuts 8a and 8b. The cylindrical member 9 which is fixed with the surface of the shaft 1 and rotatable integrally therewith is provided, upon the surface thereof, with herringbone grooves 9a for generating the dynamic pressure of the ferrofluid. Between the cylindrical non-magnetic center member 10 fixed on the interior of the magnet 2 and the surface of the cylindrical member 9 is formed a slight gap. Numerals 11a and 11b are flange-type thrust bearings fixed with the shaft member 9. Likewise, there is formed a slight gap between the pole pieces 2a, 2b and the interior of the magnet 2, and the side surface of the center member 10.

When the rotary shaft 1 and the cylindrical member 9 fixed therewith are rotated integrally to an arrow direction, the ferrofluid 7 as a lubricant is directed to a center plane section 9b of the cylindrical member 9 due to the function of the grooves 9a for generating the dynamic pressure, and its pressure is increased in this section 9b, but decreased adjacent the gaps 5 and 6. Accordingly, in cooperation with attraction of the concentrated magnetic flux in the gap 5 and 6, outside leakage of the ferrofluid 7 is prevented.

FIG. 3 shows another example of the conventional sealing and bearing means by use of ferrofluid, in which the grooves for generating the dynamic pressure 65 thereof are engraved on the surface of the rotary shaft 1 itself. The same construction as shown in FIG. 2 has the same numerals, but the thrust bearings 11a and 11b are removed. In this respect, it is different from the aforesaid thrust and radial bearing means.

Generally, bearings for generating the dynamic pressure of the ferrofluid as a lubricant have excellent properties such as high rotation accuracy, low noises, long durability, etc. In addition, such bearings are provided with sealing means by use of ferrofluid, so that any danger of oil leakage or oil splashing is removed. Accordingly, they may be used suitably for a clean room for producing large-scale integrated circuits, magnetic disc spindles, etc. where a completely clean environment is required.

However, the conventional sealing and bearing means are extremely complicated in structure and very difficult for making it compact, so that it is forced to become large-scale. On the other hand, when producing such grooves for generating the dynamic pressure, it is required to engrave accurate grooves of specified profile upon e.g. the surface of the rotary shaft. Namely, it requires a very high working accuracy, consequently the sealing and bearing means having such structure are very expensive in view of production cost and unsuitable for practical use.

Further, in the midst of assembling the bearing means, it has been required to inject the ferrofluid in advance into a gap between the rotary shaft and the bearing so that it may be filled fully therein. However, it is a cumbersome work.

Because of such disadvantages and inconveniences of the conventional sealing and bearing means by use of ferrofluid, it is entirely impossible to produce them in a mass production scale.

BRIEF SUMMARY OF THE INVENTION

Accordingly, it is a general object of this invention to provide sealing and bearing means by use of ferrofluid, in which a magnet is utilized effectively in cooperation with the grooves engraved on one surface thereof, the grooves having the function for generating the dynamic pressure of the ferrofluid.

It is another object of this invention to provide sealing and bearing means by use of ferrofluid of which structure is simple and small-sized, thereby enabling low manufacturing cost and mass production.

More specifically speaking, the present invention has the following two remarkable aspects.

(1) The sealing and bearing means by use of ferrofluid comprises a cylindrical magnet body enclosing a rotary shaft concentrically and preventing a radial movement of the rotary shaft, the cylindrical magnet body being made of a normal magnet or a plastic-contained magnet. The ferrofluid being retained in a gap between opposing surfaces of the cylindrical magnet body and the rotary shaft respectively, and the cylindrical magnet body is, on its surface sliding with the rotary shaft, provided with grooves for generating the dynamic pressure of the ferrofluid.

(2) The sealing and bearing meand for use of ferrofluid comprises a thrust support disc for preventing a thrust movement of a rotary shaft; a magnet disc opposing to the thrust support disc, the magnet disc being made of a normal magnet or a plastic-contained magnet; either one of the thrust support disc and the magnet disc being fixed with the rotary shaft, the both discs enclosing the rotary shaft concentrically; a ferrofluid being retained in a gap formed between opposing surfaces of the thrust support disc and the magnet disc; and either one of the thrust support disc and the magnet disc being, at its surface sliding with the other one, provided with grooves for dynamic pressure of the ferrofluid.

Thus, the present invention has succeeded in removing the conventional pole pieces and its related means, and realizing the sealing function and/or bearing function in a full scale.

Other further objects, features and advantages of this invention will appear more fully from the following detailed description with reference to the accompanying drawings.

BRIEF DESCRIPTION OF THE ACCOMPANYING DRAWINGS

FIG. 15(a) is a sectional view taken along the line a—a of FIG. 15(b);

FIG. 15(b) is a sectional view of a tenth embodiment of the present invention;

FIG. 16 is a sectional view of an eleventh embodiment of the present invention;

FIG. 27(a) is a sectional view of a sixteenth embodiment of the present invention;

FIG. 27(b) is a plan view of the sixteenth embodiment taken along the line b—b of FIG. 27(a);

FIG. 28 is a sectional view of a seventeenth embodiment of the present invention;

FIG. 29 is a sectional view of an eighteenth embodiment of the present invention.

DETAILED DESCRIPTION OF THE INVENTION

Figure 1:
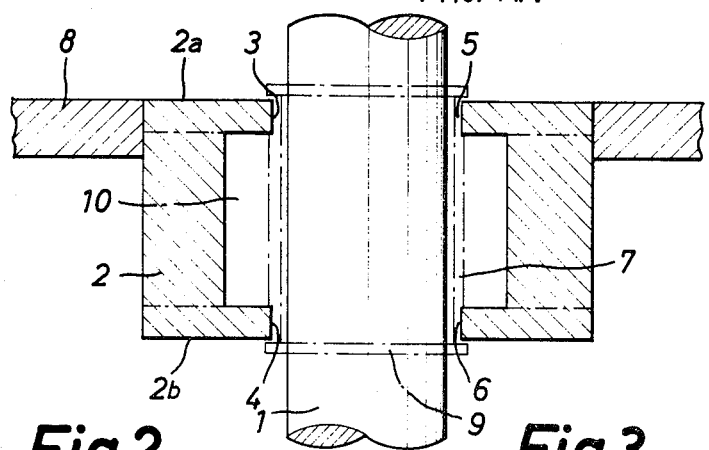
FIGS. 1, 2 and 3 are respective sectional views of conventional sealing and bearing means using a ferrofluid.
Figure 2:
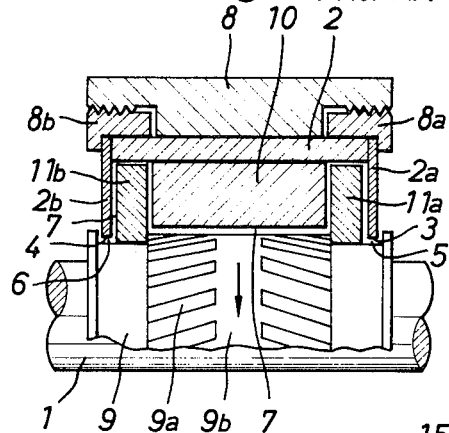
Figure 3:
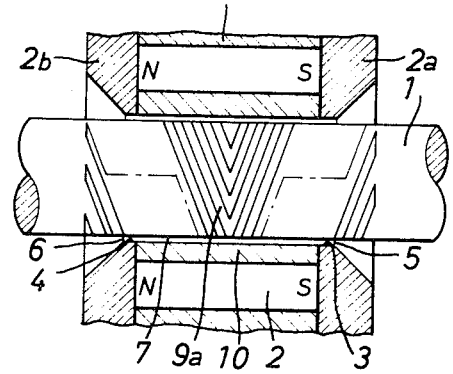

According to this invention, a plastic-contained magnet is used for bearing and sealing purposes, but a normal magnet may of course be used in lieu of the plastic-contained magnet. Before describing preferred examples of this invention, we will describe the composition of the plastic-contained magnet.

The synthetic resin material which is used for a plastic-containing magnet is made of polyamide resin, fluorine resin, polyethersulfone resin, polyphenylene sulfide resin or the like. The magnetic material to be mixed with the aforesaid synthetic resin material is made of barium ferrite powder, strontium ferrite powder, rare earths or the like.

The mixture ratio of the synthetic resin and the aforesaid normal magnetic substance is different in case the magnet is used for bearing purposes and sealing purposes.

In case the magnet is employed as bearing, it is to have enough magnetic flux to retain the ferrofluid in a gap between the magnet (bearing) and the rotary shaft and to prevent any outside leakage of it. In that case, the magnet's magnetic force may be weak practically.

Therefore, the quantity of the magnetic powder in such a magnet is about 10 to 70 weight %. Particularly, to enhance its sliding properties, preferably the magnet contains 10 to 60 weight % of carbon fiber, glass fiber or the like. Further, when graphite, etc. which have high lubricating properties are used as a filler, the quantity of the magnetic powder will of course be less. At any rate, the total quantity of the magnetic powder, reinforced fiber and filler is preferably no more than 95 weight %, within which range it is optional to define a desirable magnetic force and sliding properties.

When the magnet is used only for sealing purposes, the stronger magnetic force the better. In that case, the mixture ratio of ferrite is about 70 to 95 weight % like a normal plastic-contained magnet.

We will describe hereinafter an example of the method for producing a plastic-contained magnet of cylindrical type which is used for the bearing and sealing means of this invention. First of all, a core pin having spiral grooves for generating the dynamic pressure of the ferrofluid is inserted toward a center axis of a cylindrical cavity. In a molding device having such a structure, the fused synthetic resin in which a preferred amount of the magnetic powder is contained is injected into the cylindrical cavity. After that, the core pin is removed from the cavity while rotating it, thereby a large number of sleeves each having the spiral grooves can be produced in a mass production scale.

Next to this, each sleeve is inserted into an arbor of which diameter is a little larger than that of the sleeve, and heated therein. Then, the inner surface of each sleeve is contracted or deformed and finally finished as a complete product. After that, two sleeves each of which has grooves in a reverse direction are jointed to each other, thereby a pair of sleeves is produced as a magnet bearing having herringbone grooves for generating the dynamic pressure of the ferrofluid. Next to this, the magnet bearing is magnetized in an axial direction by a magnetizer. A magnet bearing having a larger diameter may be magnetized in a radial direction.

The profile of the herringbone grooves may be formed symmetrically relative to a joint line of two parts of the magnet bearing. Of course, it is optional to set as twist angle of the herringbone grooves relative to the joint line thereof to a desired one.

Preferred examples of this invention will now be described with the accompanying drawings.

The same construction as the aforementioned examples will be described with the same numerals.

Figure 4:
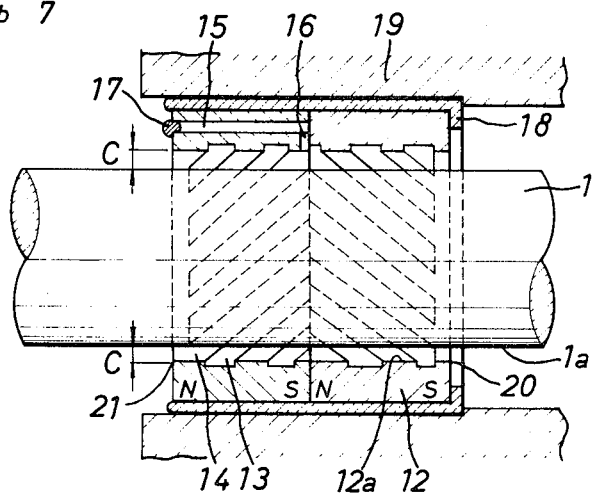
FIG. 4 is a sectional view of a first embodiment of the present invention of sealing and bearing means using ferrofluid.

FIG. 4 is the most fundamental example of this invention, in which a radial bearing means is shown.

Numeral 12 is a cylindrical magnet for enveloping the rotary shaft 1 concentrically. The cylindrical magnet 1 is a magnet bearing performing the function of bearing. As described above, it consists of a pair of sleeve, that is, two magnets are jointed to each other. The cylindrical magnet 12 is a plastic-contained magnet, i.e. a polyphenylene sulfide resin contained magnet containing e.g. 20 to 50 weight % of ferroferrite, 15 to 30 weight % of carbon fiber and 10 weight % of polytetrafluoroethylene. Numeral 13 is herringbone grooves for generating the dynamic pressure of ferrofluid, the herringbone grooves being engraved on an inner surface 12a of the cylindrical magnet 12. Symbol C is a slight gap of normally 10μm which is formed between the inner surface 12a and a surface 1a of the rotary shaft 1. Thus, the overall inner surface 12a of the cylindrical magnet 12 may contact directly the surface 1a of the rotary shaft 1 without making use of the pole pieces.

Numeral 14 is the ferrofluid filled in the gap C and numeral 15 is a passage for injecting the ferrofluid 14 thereinto. The passage 15 is formed integrally in either side of the cylindrical magnet 12.

Numeral 16 is a second passage which is also formed integrally at a contact face of the two magnets 12.

Numeral 17 is a sealing agent for sealing an opening of the passage 15. Numeral 18 is a casing for fitting or supporting firmly the pair of magnets 12. The casing 18 may be made of a non-magnetic Cu or Al alloy, a plastic material or a soft steel plate.

The plastic material may be a composite plastic one. The casing 18 may be mounted by adhesion, fitting or an integral insert molding. Further, the pair of magnets 12 may be mounted directly on a bearing mounting portion 19. It is not always required to attach the casing 18 to the pair of magnets 12.

The function of the sealing and bearing means according to this example will now be described.

After the cylindrical magnet 12 has been disposed around the rotary shaft 1, the ferrofluid is injected from the passage 15 into the gap C by means of a microdispenser or the like. The opening of the passage 15 is sealed by the sealing agent 17. The gap C between the surface 1a of the rotary shaft 1 and the inner surface 12a of the magnet 12 is so narrow that the ferrofluid 14 therein can be attracted completely by magnetic force of the magnet 12. Particularly, since the magnetic flux of the highest density is formed at both edges 20, 21 of the magnet bearing 12, any leakage of the ferrofluid 14 from the magnet 12 is prevented completely. When the rotary shaft 1 is rotated, a radial pressure of the ferrofluid 14 is generated by the pumping function of the herringbone grooves 13 for generating dynamic pressure. The radial pressure thereof is the highest level at a center of the pair of magnets 12, i.e. at a joint portion thereof, while it gets reduced toward both ends thereof. Therefore, in cooperation with attraction of magnetic force, during the rotation of the rotary shaft 1, any outside leakage of the ferrofluid 14 is entirely impossible. Owing to generation of the dynamic force, the rotary shaft 1 is supported in a center of the magnet 12 while maintaining a good balance, thereby a lubricant membrane of the ferrofluid is formed sufficiently. Accordingly, the rotational accuracy of the rotary shaft is very high, torque loss is low and load capacity is high.

The inner surface 12a of the magnet 12 is hardly worn during rotation of the rotary shaft 1, so that its durability becomes longer. As the speed of the rotary shaft 1 is reduced gradually by stopping operation, the dynamic pressure of the ferrofluid is also decreased and the rotary shaft 1 is soon seated upon the inner surface 12a due to its dead load. Even if the surface 1a of the rotary shaft 1 contacts the inner surface 12a, the magnet 12 is made of a plastic-contained material, so that the surface 1a thereof is prevented from any injury. Likewise, when the rotary shaft 1 is rotated, any inconveniences are removed. Accordingly, the magnet 12 are sufficiently capable of resisting repetition of start and stop operations.

Figure 5:
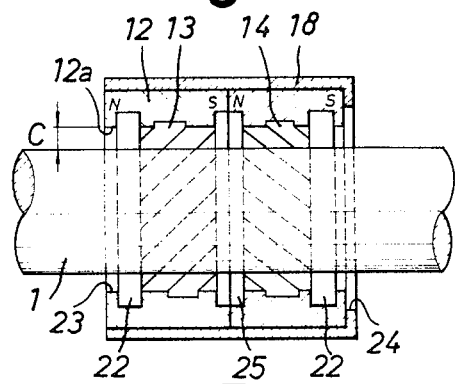
FIG. 5 is a sectional view of a second embodiment of the present invention.

FIG. 5 is a second embodiment of this invention, in which there are formed further grooves for reserving the ferrofluid adjacent two ends of the inner surface 12a of the pair of magnets 12, thereby eliminating shortage of the ferrofluid as a lubricant and enhancing the sealing effect of the ferrofluid by increasing magnetic flux density at two ends 23, 24 of the magnet 12. Further, there is formed another grooves 25 for reserving the ferrofluid 14 in the center of the inner surface 12a, whereby it is reserved in the grooves 25 in advance before inserting the magnet 12 into the rotary shaft 1.

Figure 6:
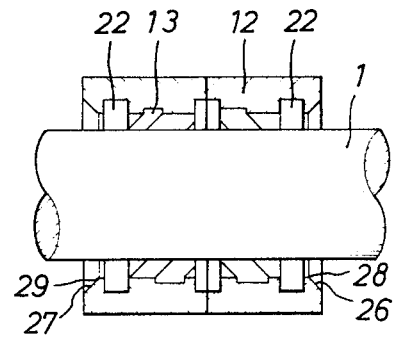
FIG. 6 is a sectional view of a third embodiment of the present invention.

FIG. 6 shows a third embodiment of this invention, in which both end corners of the magnet 12 are bevelled, thereby slopes 26, 27 are formed and edges 28, 29 are made. Due to the formation of the edges 28, 29, the density of magnetic flux at both ends of the magnet 12 is increased further and the sealing effect of the ferrofluid is enhanced. The other construction and function of this example are the same as the example in FIG. 5.

Figure 7:
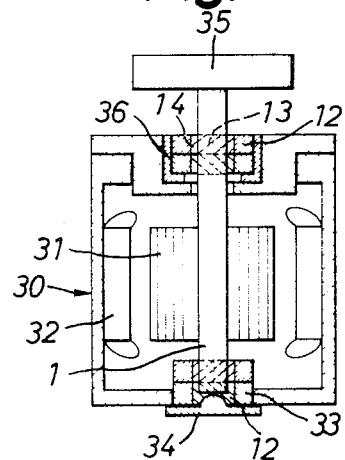
FIG. 7 is a sectional view of a fourth embodiment of the present invention.

FIG. 7 shows a fourth embodiment of this invention, in which the rotary shaft 1 is connected to a precision motor of a computer's peripheral equipment.

Numeral 30 is a direct drive motor for driving a polygon mirror of e.g. a leather beam printer. Numeral 31 is a permanent magnet rotor and numeral 32 is a stator coil opposing thereto. Numeral 33 is a radial bearing (corresponding to the plastic-contained cylindrical magnet 12) which is disposed at the lower part of the rotary shaft 1. Numeral 34 is a thrust bearing. Numeral 35 is a polygon mirror mounted on the top of the rotary shaft 1. Numeral 36 is a radial bearing disposed at the upper part of a casing of the motor 30. The radial bearing 36 has the plastic-contained cylindrical magnet 12 enclosing the rotary shaft 1 concentrically, and the magnet 12 is provided, on its inner surface, with the herringbone grooves 13 for generating the dynamic pressure of the ferrofluid. The ferrofluid 14 is filled between the magnet 12 and the rotary shaft 1.

Conventionally, a ball bearing or an oil-contained bearing has been used, wherein there exists the disadvantage that the polygon mirror 35 may lose its function due to splashing of lubricating oil or grease caused by centrifugal force of the rotary shaft 1. For this reason, a high-speed rotation of the rotary shaft 1 is impossible. A further disadvantage is that even if the rotary shaft 1 is rotated at a lower speed, durability of the conventional bearing means is short. In order to remove such disadvantages, the present invention provides a radial magnet bearing having grooves for generating the dynamic pressure, thereby removing any splashing of the ferrofluid as a lubricant which may be caused by rotation of the rotary shaft 1. Further, any dust that may come from the interior of spindle is prevented from splashing outside the radial magnet bearing owing to the sealing effect of the ferrofluid.

Figure 8:
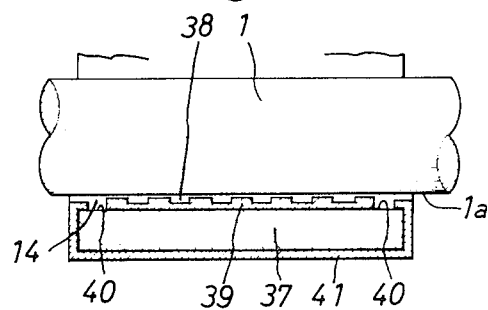
FIG. 8 is a sectional view of a fifth embodiment of the present invention.

FIG. 8 shows a fifth embodiment of this invention, in which a cylindrical magnet 37 enclosing the rotary shaft 1 cylindrically is, on its inner surface, provided with a thin plastic coating 39 having herringbone grooves 38 for generating dynamic pressure. And, two end surfaces 40, 40 of the magnet 37 are opposed directly to the surface 1a of the rotary shaft 1, thereby a slight gap is formed between the surface 1a of the rotary shaft and the end surfaces 40, 40.

The ferrofluid 14 filled in the gap is attracted by magnetic flux of the magnet 37. A casing 43 may also be made of either steel or plastics like the first example. Magnetic flux is concentrated easily upon the naked end surfaces 40, 40 of the magnet 37, so that the ferrofluid 14 is retained firmly in the gap. Further, since the plastic coating 39 has good sliding property and wear proof, the cylindrical magnet 37 as a bearing is prevented from wearing due to the start and stop operations of the rotary shaft 1. That is, the inner surface of the magnet 37 is prevented from a direct contact with the rotary shaft 1, the magnet 37 may contain a low cost synthetic resin without considering any sliding property or wear proof. Of course, any kind of magnets are available.

Figure 9:
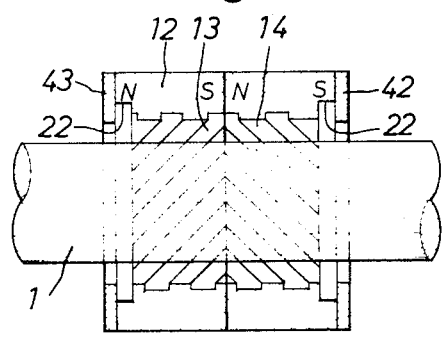
FIG. 9 is a sectional view of a sixth embodiment of the present invention.

FIG. 9 is a seventh embodiment of this invention, in which grooves 22, 22 for reserving the ferrofluid 14 are engraved on both end peripheries of the magnet bearing 12. Further, the magnet 12 is, at its both sides, fixed with non-magnetic pole pieces 42, 43.

Since the grooves 22, 22 for reserving the ferrofluid 14 are formed on both ends of the magnet 12, magnetic field intensity in the grooves 22, 22 is strong, thereby the ferrofluid is retained firmly therein. Further, since the pole pieces 42, 43 are non-magnetic, any leakage of the ferrofluid 14 from the magnet 12 is entirely prevented.

Of course, the pole pieces 42, 43 may be made of a magnetic substance, whereby magnetic flux density between the pole pieces 42, 43 and the rotary shaft 1 becomees strong, thereby the sealing effect is enhanced furthermore.

Figure 10:
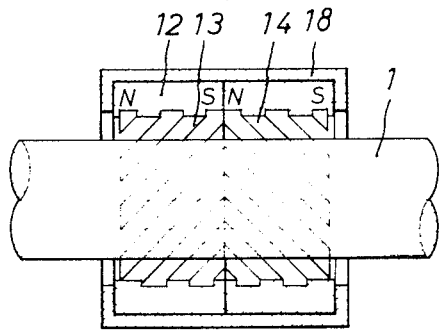
FIG. 10 is a sectional view of a seventh embodiment of the present invention.

FIG. 10 is a seventh embodiment of this invention, in which the magnetic case 18 is fixed with the outer periphery and both edges of the magnet 12. Thus, magnetic flux density between the casing 18 and the rotary shaft 1 is stronger than that of the first example, thereby the sealing effect is enhanced furthermore.

Figure 11:
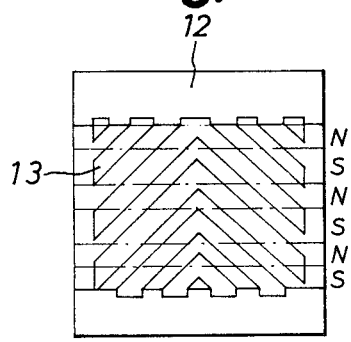
FIGS. 11 and 12 are respective expanded views of a plastic-contained magnet to be used is the present invention.
Figure 12:
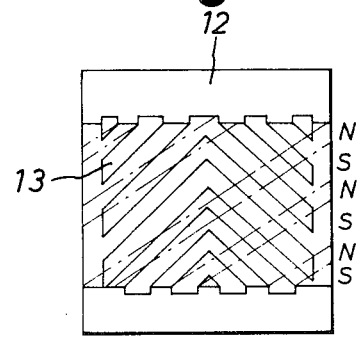

FIGS 11 and 12 are two examples showing magnetic structure of the magnet 12. Namely, in FIG. 11 the magnet 12 is magnetized in parallel with a horizontal axis thereof in a multiple manner.

On the other hand, in FIG. 12 the magnet bearing 12 is magnetized in an oblique direction relative to a horizontal axis thereof in a multiple manner.

In case of the thrust bearing which will be described hereinafter, its magnetization may be made in the same multiple manner on a plane of the thrust bearing.

Figure 13:
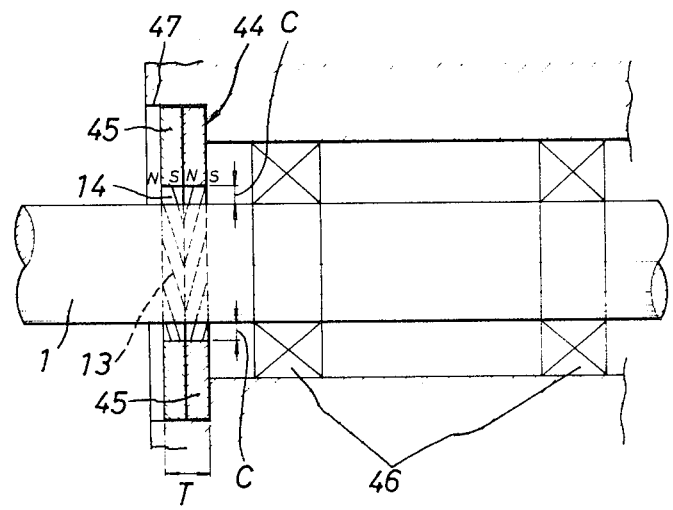
FIG. 13 is a sectional view of an eighth embodiment of the present invention.

FIG. 13 is an eighth embodiment of this invention, in which the bearing means for sealing the ferrofluid is used exclusively for sealing purposes. Conventionally, there exists no cylindrical magnet for purpose of sealing only, which has the grooves for generating dynamic pressure.

Numeral 44 is sealing means for sealing ferrofluid. Numeral 45 is a pair of magnets of which thickness T is thinner than that of the aforesaid radial bearing. The gap C between the pair of magnets 45 and the rotary shaft 1 becomes larger than that of the latter. Further, the herringbone grooves 13 are engraved deeply, thereby reducing torque loss or heat generation of the rotary shaft 1 due to resistance of the ferrofluid 14. It is optional to remove a passage for injecting the ferrofluid 14.

Further, numeral 46 is a bearing for supporting the rotary shaft 1 and numeral 47 is a seat for receiving the sealing means 44.

During rotation of the rotary shaft 1, the dynamic pressure of the ferrofluid 14 becomes high, so that the sealing means 44 must have air-tightness enough to cope with the inner pressure or outer pressure of the rotary apparatus. In particular, the aforesaid sealing means is suitable for sealing gas and liquid, and shows excellent sealing effect in comparison with the conventional oil seal means. Further, whereas the life span of the conventional oil seal means is short due to wearing of a lip due to continuous rotation, the sealing means of this example is prevented from contacting directly with the rotary shaft 1, so that even if the rotary shaft is rotated continuously for a long time, the life span of the present sealing means is long.

Figure 14:
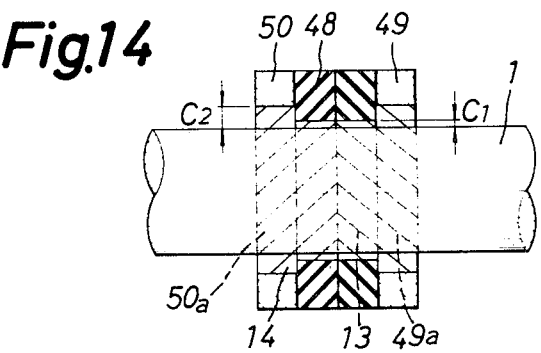
FIG. 14 is a sectional view of a ninth embodiment of the present invention.

FIG. 14 shows a ninth embodiment of this invention, inwhich a non-magnetic plastic bearing is combined with the sealing means for sealing ferrofluid.

Numeral 48 is a bearing sleeve of split type which is of a non-magnetic plastic molded article.

It is, in its inner surface, provided with the herringbone grooves 13. Numerals 49 and 50 are plastic-contained magnets, on which inner surface are engraved spiral grooves 49a and 50a. The magnets 49, 50 support the split bearing sleeve 48. A casing for supporting the above means is not illustrated.

When the rotary shaft 1 is rotated, it is centered suitably by the dynamic pressure of the ferrofluid which is generated in a gap $C_1$ between the split bearing sleeve 48 and the rotary shaft 1. Further, the sealing effect is enhanced furthermore by magnetic force generated between the sealing means 49, 50 and the rotary shaft 1.

When the rotary shaft 1 stops, it is seated upon the inner surface of the bearing sleeve 48 having a narrower gap $C_1$, so that the sealing means 49, 50 are prevented from contacting directly with the rotary shaft 1. Accordingly, regardless of repetition of start and stop of the rotary shaft 1, the life span of the sealing means becomes longer than that of the device in FIG. 9.

FIG. 15(b) shows a tenth embodiment of this invention, in which a plastic-contained magnet thrust bearing is shown.

Numeral 52 is a plastic-contained magnet disc opposing to a plane 51a of a thrust support disc 51, into which the rotary shaft 1 is penetrated. The ferrofluid 14 is retained in a gap between a plane 52a of the magnet disc 52 and the plane 51a of the thrust support disc 51. The magnet disc 52 is, on its inner plane 52a, provided with herringbone grooves 52 for generating the dynamic pressure and reserving grooves 54, 55 for reserving the ferrofluid 14.

Thus, a strong magnetic circuit is formed between the magnet disc 52, the thrust support 51 and the magnetic rotary shaft 1, thereby the ferrofluid 14 is retained firmly and the sealing effect is enhanced. As a result, start torque of the rotary shaft 1 becomes large. Accordingly, when an operator desires to make the start torque lesser even if the sealing effect is rather decreased, the thrust support plate 51 may be made of a non-magnetic material.

Referring to FIG. 15(b), the magnet disc 52 is fixed with the rotary shaft 1 by means of a stopper 56 which penetrates into the rotary shaft 1, thereby the magnet disc 52 and the rotary shaft 1 are rotated integrally. The thrust support disc 51 is fixed with a body of rotary apparatus. Further, it is also possible to fix the rotary shaft 1 with the thrust support disc 51 and separate the magnet disc 52 from the rotary shaft 1.

The magnet disc 52 is made of a magnetic compound comprising 10 to 70 weight % of magnetic powder, synthetic resin, reinforced fiber, lubricating oil and the like by means of injection molding, whereby the herringbone grooves 53 and the reserving grooves 54, 55 can be formed integrally upon the magnet disc 52. Thus, it is inexpensive and desirable for mass production.

The magnet disc 52 is capable of attracting firmly the ferrofluid 14 having both the lubricating and sealing functions owing to the effect of magnetic field intensity of the magnet disc 52, thereby a good lubricating membrane is formed during rotation of the rotary shaft 1 and its torque loss is small. When the rotary shaft 1 stops, the ferrofluid 14 is reserved in the grooves 54, 55, thereby any outside leakage of it is prevented.

FIG. 16 shows an eleventh embodiment of this invention, in which the thrust bearing 57 is connected to the small-sized motor 30 in FIG. 7.

Numeral 58 is a support disc made of a magnetic material, thereby preventing leakage of magnetic force of the plastic-contained magnet disc 52 and reinforcing magnetic force for attracting the ferrofluid 14.

Numeral 59 is a fly wheel. The torque loss of the present thrust bearing 57 is much smaller than that of the conventional bearing. Thus, the thrust bearing 57 is connected to such a small-sized motor having small torque.

Figure 17:
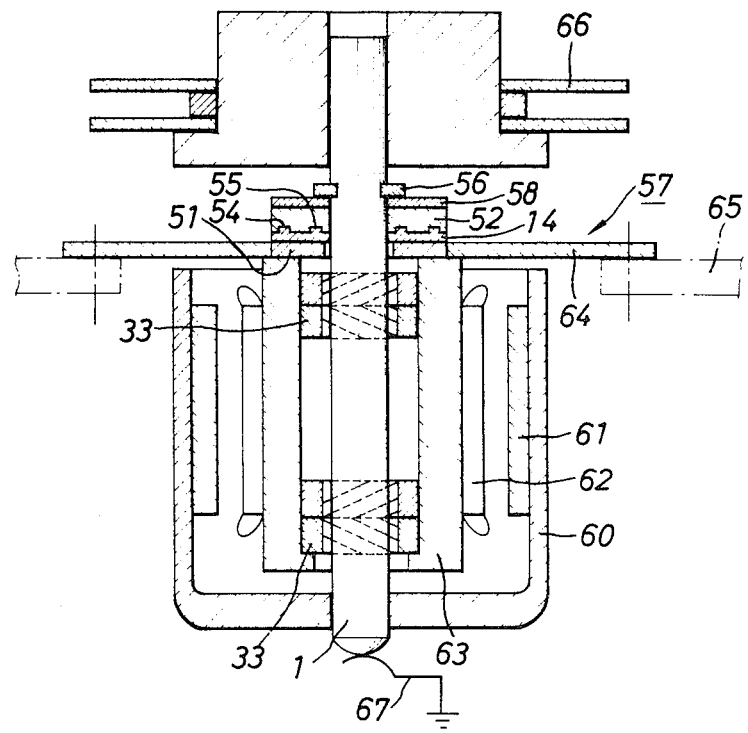
FIG. 17 is a sectional view of a twelfth embodiment of the present invention.

FIG. 17 shows a twelth embodiment of this invention, in which the thrust bearing 57 is used for a magnetic disc.

Numeral 60 is an outer rotor, on which inner circumference is mounted a magnet 61. Numeral 62 is a coil which is fixed with a stator 63. Numeral 64 is a flange fixed with the stator 63, and the flange 64 is supported by a support 65. Numeral 66 is a magnetic disc fixed with an upper part of the rotary shaft 1. The outer rotor 60 is connected to the rotary shaft 1 is rotatable integrally therewith. Numeral 67 is earth.

According to this example, the ferrofluid is attracted strongly inside the thrust bearing 57 by magnetic force. Accordingly, any outside leakage of it is entirely prevented unlike the conventional thrust bearing. The magnetic disc 66 is thus free from any spoiling that may be caused by splashing of the ferrofluid. Thus, a direct drive motor for the magnetic disc which has excellent porperties is obtained.

With reference to the aforesaid examples we have so far explained the basic structure and effect of this invention. Namely, the sealing and bearing means of this invention can retain firmly the ferrofluid by employing a plastic-contained magnet body or disc. Thus, the sealing and bearing means having such a simple structure is suitable for working process and mass production.

Further, various examples of the bearing and sealing means by use of ferrofluid according to this invention will now be described with reference to the accompanying drawings.

First of all, a clear difference between this invention and the conventional art will be discussed.

Figure 18:
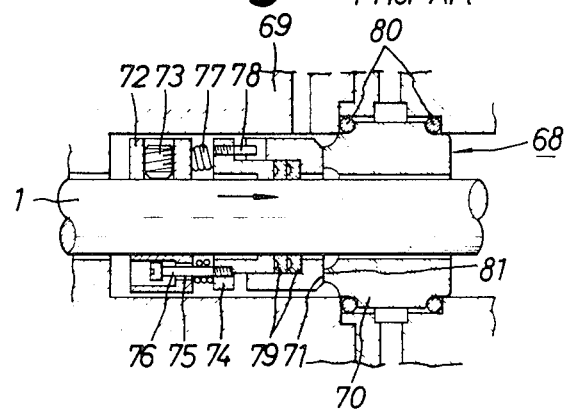
FIG. 18 is a sectional view of a conventional mechanical seal means.

FIG. 18 shows a view of the conventional mechanical sealing means. Numeral 68 is a mechanical seal means which is incorporated in a housing 69. And the, rotary shaft 1 of rotary apparatus such as a pump or the like passes through a center of the mechanical seal means. Numeral 70 is a graphite-made insert. Numeral 71 is a seal ring which is rotatable and slidable while pressing the insert 70. Numeral 72 is a collar fixed with the rotary shaft 1 by a screw 73. Numeral 74 is a comp-ring fixed with an end of a connecting pin 76 mounted in a path of the collar 75. Numeral 77 is a spring for pressing the comp-ring 77 in an arrow direction. Numeral 78 is a drive pin connected to the comp-ring 77, thereby the seal ring 71 is always pressed to the insert 70 and rotatable integrally with the rotary shaft. Numerals 79 and 80 are packings for sealing the rotary shaft 1 and the insert 70.

According to such a conventional mechanical seal means, the rotary shaft 1 is driven by a joint contact 81 of the graphite-made insert 70 and a mirrored surface of the seal ring 71, whereby any high-pressurized fluid to be rotated at a high speed within a pump is prevented from leaking outwardly.

However, since the graphite-made insert 70 contacts the seal ring 71 at a high speed rotation, the inconvenience is that the insert 70 made of a relatively soft graphite is worn off in a short period and its life span is limited. Further, this mechanical seal means requires a high working technique as well as a high production cost and its mechanism is very complicated. Further, in case a certain solid matters are contained in the fluid, the damage of the sealing surface becomes large and leakage of the fluid occurs frequently.

In order to overcome such inconveniences of the conventional technique, we have developed novelty sealing and bearing means by use of ferrofluid.

More specifically speaking, it comprises a thrust support disc for preventing a thrust movement of a rotary shaft; a magnet disc opposing to the thrust support disc; either one of the thrust support disc and the magnet disc being fixed with the rotary shaft; a ferrofluid being retained in a gap formed between opposing surfaces of the thrust support disc and the magnet disc; and either one of the thrust support disc and the magnet disc being, at its surface sliding with the other one, provided with grooves for dynamic pressure of the ferrofluid.

Further, either one thereof is always resiliently pressed to the other one by a spring material.

Preferred examples of this invention will now be described with reference to FIGS. 19 to 25.

The same numerals as the conventional device of FIG. 18 and the aforesaid various examples will be used in the following examples.

Figure 19A:
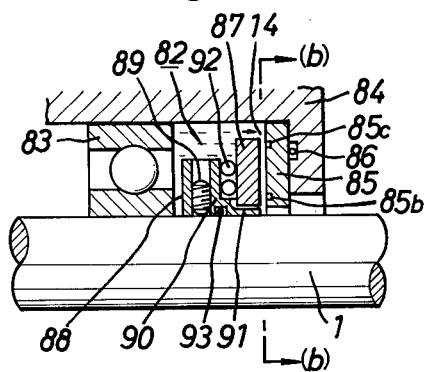
FIG. 19(a) is a sectional view of a thirteenth embodiment of the present invention.

FIG. 19(a) is a thirteenth embodiment of this invention, in which seal means 82 is shown. The rotary shaft 1 is disposed in a housing 84 of rotary apparatus (not illustrated) such as a pump or the like.

Numeral 85 is a magnet disc (or a seal ring) fixed with the interior of the housing 84 by means of an O-ring 86, and has means for generating the dynamic pressure of the ferrofluid. Numeral 87 is a thrust support disc (or seal ring) opposing to the seal ring 85. Numeral 88 is a collar fixed with the rotary shaft 1 by a screw 89. The collar 88 is, at its lower stage 90, provided with a groove 91 for driving the thrust support disc 87. Namely, the seal ring is engaged slidably with the groove 91. A plurality of O-rings 92 made of a resilient material are disposed between the thrust support disc 87 and the collar 88 in order to press the thrust support disc 87 in an arrow direction. Numeral 93 is a packing for the rotary shaft 1.

Figure 19B:
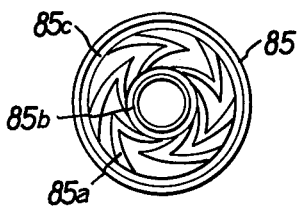
FIG. 19(b) is a plan view of the thirteenth embodiment along the line b—b of FIG. 19(a)

The magnet disc 85 may be made of a plastic-contained magnet. For example, it may consist of a polyamide resin compound containing 80 weight % of barium-ferrite powders and be molded by an injection molding machine. Numeral 85a is herringbone grooves for generating the dynamic pressure of the ferrofluid 14, which is engraved on the inner surface of the magnet disc 85. In addition, the magnet disc 85 is provided with reserving grooves 85b and 85c for reserving the ferrofluid. Those grooves 85a, 85b and 85c may of course be integrally formed at the time of injection molding. FIG. 19(b) shows a pattern of those grooves. The material of the thrust support disc 87 may be made of either a magnetic substance or a non-magnetic substance. For example, when a magnetic substance such as a soft steel is used for the thrust support disc 87, a suitable magnetic circuit is formed between two discs, thereby the ferrofluid therebetween causes a strong attraction. Thus, this structure is suitable for the case requiring a high sealing effect. When a non-magnetic substance is used for the thrust support disc 87, torque of the rotary shaft 1 at its starting time is small. Thus, this case will be suitable for a low start torque. Further, when sealing e.g. corrosive fluid, preferably a non-magnetic stainless steel material is used for increasing anti-corrosive property.

Further, the position of the magnet disc 85 is replaceable with that of the thrust support disc 87. Further, the support disc 87 may be made of a magnetic substance, while the magnet disc 85 may be made of a non-magnet substance.

Still further, the O-ring 92 applying resilience to the support disc 87 may be replaced with a X-ring or a D-ring of different profile. Or, a compressive spring may be used, in which case it is required to mount a sealing member between the support disc 87 and the surface of the rotary shaft 1.

The function of this example will now be described.

When the rotary shaft 1 stops, the opposing surfaces of the two discs 85 and 87 are pressed each other due to resilience of the plurality of O-rings 92, thereby only a thin membrane of the ferrofluid 14 is formed therebetween. The depth of the gap becomes no more than a few μm. Magnetic flux is concentrated upon the edge portion of the herringbone grooves 85a. Further, the sealing effect is capable of resisting about 5 atmospheric pressure. As long as the rotary shaft 1 stops, the most part of the ferrofluid 14 is stored in the reserving grooves 85b and 85c, and any outside leakage of it is prevented. When the rotary shaft 1 starts rotation, the ferrofluid 14 is concentrated toward a center of the gap between the two discs 85 and 87 due to the pumping function of the herringbone grooves 85a. As soon as the rotary shaft 1 is rotated at a very low speed of about 10 to 20 r.p.m., a lubricating membrane of the ferrofluid 14 is formed sufficiently, thereby the two discs are rotated to each other in a non-contact condition. Thus, the two opposing surfaces of the both discs 85 and 87 hardly wear.

During a normal operation of the rotary shaft 1, the pressure resistance of sealing reaches 5 to 200 atmospheric pressures in relation with the inner pressure of a central sealing surface due to the function of the herringbone grooves 85a for generating the dynamic pressure of the ferrofluid 14. Accordingly, the present device can attain enough sealing effect by resisting various pressures.

Figure 20A:
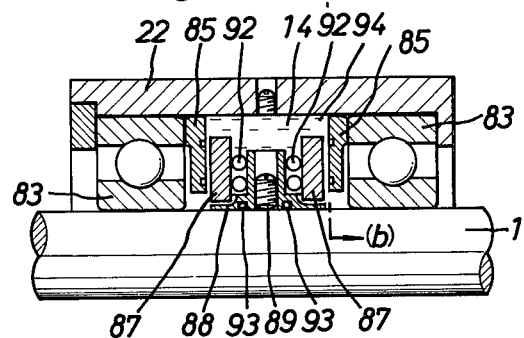
FIG. 20(a) is a sectional view of a fourteenth embodiment of the present invention.
Figure 20B:
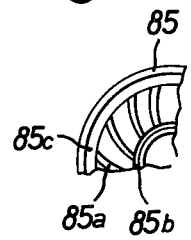
FIG. 20(b) is a partial plan view of the fourteenth embodiment taken alont the line b—b of FIG. 20(a)

FIG. 20 shows a fourteenth embodiment of this invention, in which a double seal means is disposed, namely two seal means 82 are opposing to each other, thereby the pressure resistance of sealing is enhanced furthermore. In this case, the ferrofluid is fully filled and sealed in a space 94 formed between the seal means 82 and the housing 84. Since the herringbone grooves 85a for generating the dynamic pressure are formed in a spiral pattern as shown in FIG. 20(b), the ferrofluid 14 can be directed to the space 94 due to its pumping effect.

Figure 21:
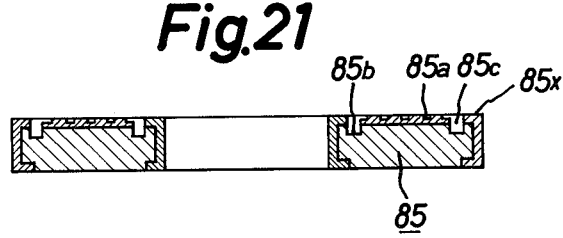
FIG. 21 illustrates a seal ring to be used in the fourteenth embodiment of the present invention.

FIG. 21 shows an example of the magnet disc 85, on which surface is formed a coating 85x of synthetic resin. The material of the magnet disc 85 may be made of steel or plastics or magnet or a non-magnetic substance. The coating 85x made of a preferred plastic or composite plastic material having high wear resistance is formed by insert molding. Then, herringbone grooves 85a are formed at the same time. For example, the magnet disc 85 can be made of a polyamide resin contained magnet comprising 80 weight % of barrium ferrite powder. On the other hand, the coating 85x is made of a polyphenylsulfide resin containing 20 weight % of carbon fiber, and its thickness is 80 μm.

As a result, we have found that a linear expansion coefficient of the magnet disc 85 is nearly equivalent to that of the coating 85x. The herringbone grooves 85a formed on the coating 85x is very thin, i.e. few ten μm at thickness and has enough capability to retain the ferrofluid therein. Accordingly, the magnet disc 85 can enhance its wearproof and anticorrosive properties furthermore.

Figure 22:
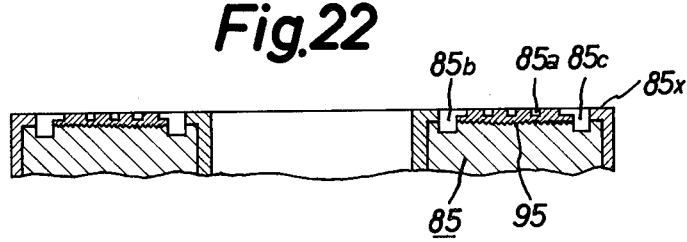
FIG. 22 illustrates another seal ring.

FIG. 22 shows another example of the magnet disc 85, on which surface is formed a zigzag rough surface 95, thereby the coating 85x can be adhered strongly thereto.

Figure 23:
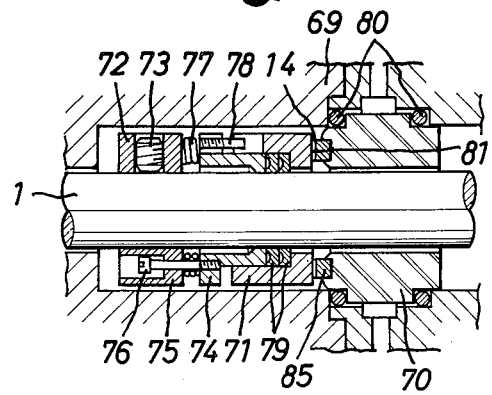
FIG. 23 is a sectional view of a fifteenth embodiment of the present invention.

FIG. 23 shows a fifteenth embodiment of this invention, in which the disadvantage of the conventional art shown in e.g. FIG. 18 has been removed. In this example, between the surface of the seal ring 71 and the surface of the insert 70 is formed the seal ring 85, on which surface are also engraved the herringbone grooves 85a for generating the dynamic pressure of the ferrofluid. Speaking more specifically, the herringbone grooves 85a are formed upon a 4-ethylene-fluoride resin membrane of the seal ring 85 by means of insert molding. Thus, the surface of the insert 70 is separated from that of the seal ring 71 by making use of the ferrofluid.

This sealing means is suitable for sealing a rotary shaft of a relatively large-scale compressor or pump.

Figure 24A:
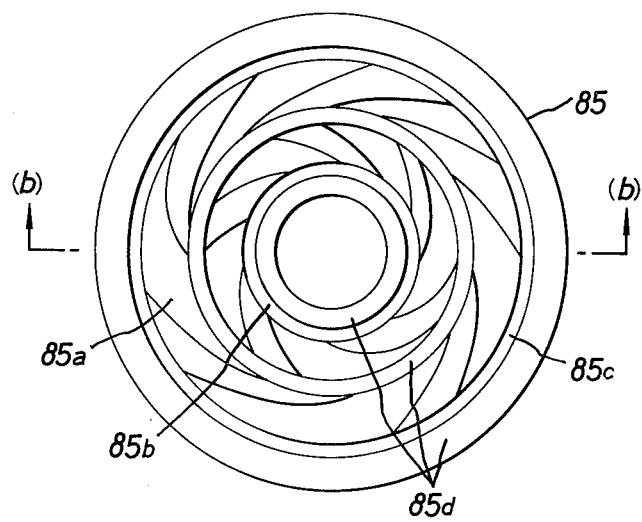
FIG. 24(a) is a plan view of a seal ring to be used in the thirteenth embodiment of the present invention.
Figure 24B:
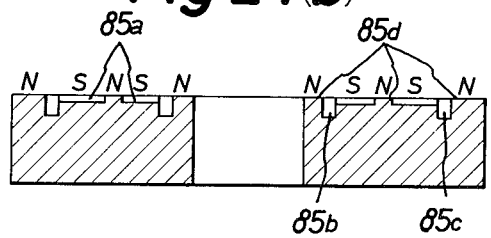
FIG. 24(b) is a sectional view of the seal ring taken along the line b—b of FIG. 24(a)

FIG. 24(a) shows another example of the magnet disc 85 for obtaining a sufficient pressure resistance of seal means. Namely, in order to increase the pressure resistance at the stopping time of the rotary shaft 1, at least one circular flattened sealing portion 85d is formed annularly on the herringbone pattern surface. In FIG. 24(a) there are three circular flattened sealing portions 85d. Although the magnet disc 85 may be magnetized in a thickness direction, in this example it is done on the plane surface in a multiple annular form. Under such circumstances, when the rotary shaft 1 stops, the sealing effect on the plane surface is obtained and simultaneously the effect capable of sealing any slight gap by use of the ferrofluid is obtained. Thus, a dual sealing function can be attained in a poweful scale.

Figure 25A:
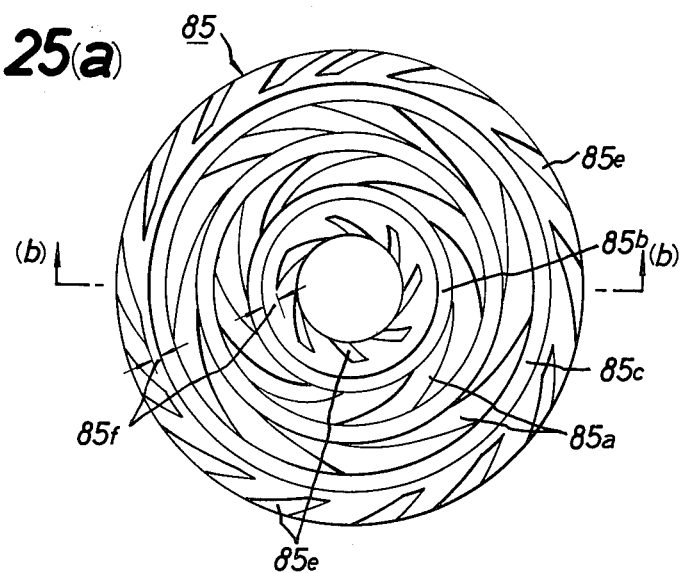
FIG. 25(a) is a plan view of a seal ring to be used in the thirteenth embodiment of the present invention.
Figure 25B:
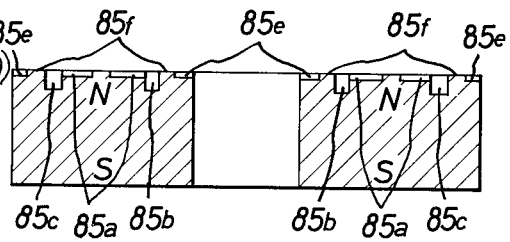
FIG. 25(b) is a sectional view of the seal ring taken along the line b—b of FIG. 25(a)

FIG. 25(a) is another example of the magnet disc 85, in which the pressure resistance of sealing is increased further. According to this example, in addition to the herringbone grooves 85a, there are formed grooves 85e for preventing the liquid to be sealed so that it is not penetrated into the herringbone grooves 85a for generating the dynamic pressure. The grooves 85e having such a purpose are formed at either an outer periphery of the magnet disc 25 or an inner periphery thereof.

In this case, a direction of the herringbone grooves 85a is to be contrary to a direction of the grooves 85e.

Further, the grooves 85e are spaced a little from the reserving grooves 85b and 85c. Further, it is desirable to form a circular flattened portion 85f.

As described above, according to a remarkable aspect of this invention, between the magnet disc having the herringbone grooves for generating the dynamic pressure, and the thrust support disc opposing thereto is filled the ferrofluid, thereby the both discs are rotated each other in a non-contact condition.

Preferred examples of this invention in which the sealing function and the bearing function can exert effectively in a radial and thrust direction will now be described with reference to FIGS. 27 to 29.

Figure 26:
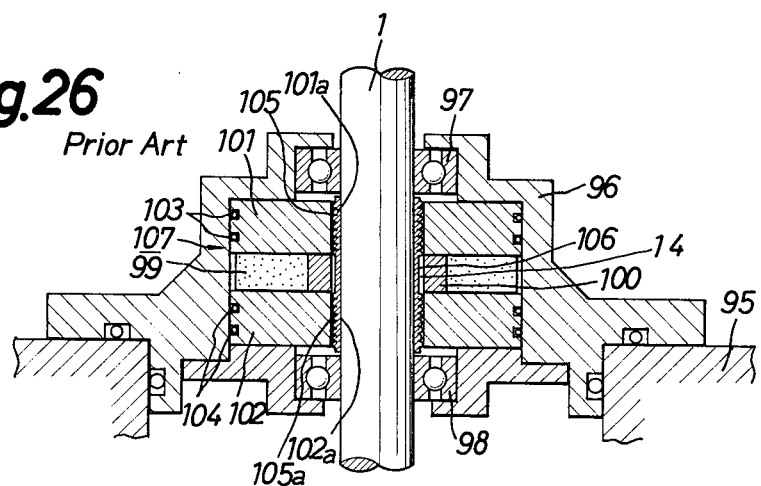
FIG. 26 is a sectional view of a conventional sealing means.

In this connection, first of all we will comment on the prior art disclosed in FIG. 26.

Generally, to seal the rotary shaft, there are used O-rings, Wilson rings, etc., but their disadvantage is that a high-speed rotation of the rotary shaft will be difficult without supplying lubricating oil and some leakage or splashing of the lubricating oil may occur. For this reason, the ferrofluid is used to seal the rotary shaft.

From the theoretical point of view, the sealing means by use of ferrofluid assures a high speed rotation of the rotary shaft and a complete sealing without supplying any lubricating oil even in a high vacuum condition of $10^{-8}$ Torr. Accordingly, it is very suitable for sealing a rotary shaft of e.g. a vacuum machine.

FIG. 26 shows a section view of the conventional sealing and bearing means by use of ferrofluid.

Numeral 95 is a container such as a vacuum tank which is mounted in the sealing and bearing means. Numeral 96 is a housing airtightly mounted on the container 95, which is rotatable with the rotary shaft 1 by way of ball bearings 97, 98. Numeral 107 is seal means by use of ferrofluid which is incorporated within the housing 96. The seal means 107 comprises a magnet ring 99, a non-magnetic ring 100 connected thereto and opposing directly to the rotary shaft 1, and poles pieces 101, 102 supporting the magnet ring 99 and the non-magnet ring 100. Numerals 103 and 104 are O-ring for sealing a gap between the housing 96 and the pole pieces 101, 102.

A large number of projections 105a are formed on a cylindrical sleeve 105 fixed with a first surface 101a and a second surface 102a of the rotary shaft 1. The ferrofluid 14 as a sealing agent is filled in a gap 106 between the rotary shaft 1 and the seal means 107. Then, it is firmly attracted by the magnetic flux formed between the pole pieces 101, 102 and the large number of projections 105a.

However, the pressure resistance of such a conventional means is very low per stage of the plurality of projections 105a, i.e. about 0.1 atmospheric pressure. Accordingly, in order to increase the pressure resistance further, a multi-stage labyrinth sealing structure is required. Moreover, the magnet 99 must be powerful and large-size. As a result, the structure of the conventional means is complicated and its production cost is very expensive. To remove such disadvantages of the prior art, the present invention has been accomplished.

According to a remarkable aspect of this example, the sealing and bearing means by use of ferrofluid comprises the following components: at least one radial seal ring consisting of a pair of magnets, on which inner surface are formed herringbone grooves for generating the dynamic pressure of the ferrofluid; a thrust support disc rotatable integrally with the rotary shaft; and a pair of fixed seal rings (made of magnet) spaced from the rotary shaft which are opposing to two surfaces of the thrust support disc.

Either one of the thrust support disc and the pair of fixed seal rings is made of a magnet, while the other one is, on its surface, provided with the herringbone grooves for generating the dynamic pressure of the ferrofluid. Thus, the above sealing means realizes a complete sealing effect.

FIG. 27(a) shows a sixteenth embodiment of this invention. Numeral 108 is a radial seal ring and numeral 109 is a thrust seal ring. Numeral 110 is a magnetic seal unit comprising integrally the radial seal ring 108, the thrust seal ring 109 and the ferrofluid 14.

The radial seal ring 108 consists of a pair of plastic-contained magnets enclosing the rotary shaft 1 concentrically, and is, on its inner surface, provided with herringbone grooves 111 for generating the dynamic pressure of the ferrofluid.

The thrust seal means 109 comprises a thrust support disc 112 and two magnets 113 opposing to the thrust support disc 112 and spaced from the rotary shaft 1. The two magnets 113 are fixed with the housing 96. Each magnet 113 is, on its inner surface opposing to the thrust support disc 112, provided with herringbone grooves 113a of which depth is about 20 to 30 $\mu$m. On respective inner and outer peripheries of the herringbone grooves 113a (shown in FIG. 27(b)) are disposed circular grooves 113b and 113c for reserving the ferrofluid 114. The magnet 113 is manufactured by the same way as mentioned previously.

The thrust support disc 112 may be replaced with a soft steel disc as a magnetic material, thereby a desired magnetic circuit is obtained. Namely, attraction of the ferrofluid is strong and the pressure resistance of sealing is increased. On the other hand, if the thrust support disc 112 is replaced by a non-magnetic material such as a stainless disc, a starting torque of the rotary shaft 1 becomes small. Accordingly, the material of the thrust support disc 112 is dependent upon the use condition. Further, it is possible to engrave the herringbone grooves 113a and the reserving grooves 113b and 113c at least one surface of the thrust support disc 112. Further, the thrust support disc 112 may be made of a magnet, while the magnet 113 may be replaced with a non-magnet member. Still further, the profile of the grooves 113a may be of a spiral pattern.

The function of the sealing and bearing means according to this invention will now be described hereinafter.

During the time when the rotary shaft 1 stops, the ferrofluid 14 is attracted by magnetic force, thereby any outside leakage or splashing of it is entirely prevented. Thus, the sealing effect by use of the ferrofluid 14 is obtained in a radial and thrust direction. In this case, a sealing gap becomes very small, and magnetic flux intensity of the edge portion of the herringbone grooves is intensified. Thus, the pressure resistance is increased furthermore. When the rotary shaft 1 starts, the ferrofluid 14 is concentrated on a center of the sealing surface by the pumping function of the herringbone grooves 111 and 113a. As soon as the rotary shaft 1 starts with a very slow speed of 10 to 20 r.p.m, a sufficient lubricating membrane of the ferrofluid 14 is formed. The pressure resistance during a normal operation of the rotary shaft 1 reaches 5 to 200 atmospheric pressures due to the pressure at the center of the sealing surface which is caused by the function of the herringbone grooves 111 and 113a. Thus, the present sealing means assures a complete sealing effect capable of coping with a broad range of pressure including a high vacuum seal, a highly pressurized seal, etc. Even if the rotary shaft 1 rotates high speedily, the ferrofluid is attracted completely by magnetic force, thereby any outside leakage is entirely prevented.

FIG. 28 shows a seventeenth embodiment of this invention, in which the ball bearings 97 in FIG. 27 are replaced with the radial seal ring 108.

As soon as the rotary shaft 1 rotates, a high pressure of the ferrofluid is generated due to the pumping function of the herringbone grooves 111 and 113a. The rotary shaft 1 is rotated in a radial and thrust direction without contacting the two radial seal rings 108 and the thrust seal means 109. In addition, the radial seal rings 108 and the thrust seal means 109 perform the function of bearings. Thus, their wear is very small and neither splashing of the ferrofluid nor noisy sound by rotation arises.

FIG. 29 shows an eighteenth embodiment of this invention, in which the radial seal ring 108 and the thrust seal means 109 are combined with a plastic or composite plastic-made bearing 114 of ring-type. That is, the bearing 114 is made of a non-magnetic material. The radial seal ring 108 is divided into four rings and disposed so as to support the plastic bearing 114. The inner diameter of the plastic bearing 114 is a little smaller than that of the radial seal ring 108. Accordingly, when the rotary shaft 1 stops, it is seated upon the interior 114a of the plastic bearing 114. Thus, the rotary shaft 1 does not contact at all the radial seal rings 108. Therefore, the wear resistance of the plastic material used for the radial seal ring 108 may be lower than that of the radial seal ring in FIG. 28. Further, the surface of the rotary shaft 1 is free from any friction by a magnetic powder contained in the radial seal ring 108, thereby damage of the rotary shaft 1 is very little. The structure of this example is suitable for frequent start and stop operations of the rotary shaft 1.

The structure of the thrust seal means 109 in FIG. 29 is different from that in FIGS. 27 and 28. That is, the thrust seal ring 112 is engaged with a collar 115 fixed with the rotary shaft 1. The thrust seal ring 112 is always pressed resiliently to the fixed seal ring 113 by means of a plurality of O-rings 116. The ferrofluid 14 is fully filled in a space 117.

During the time when the rotary shaft 1 stops, the thrust seal ring 112 is pressed to the fixed seal ring 113, so that attraction by magnetic force of the ferrofluid is increased further, and the pressure resistance of sealing become larger. Namely, a gap between the both rings 112 and 113 is sealed entirely.

Figure 30:
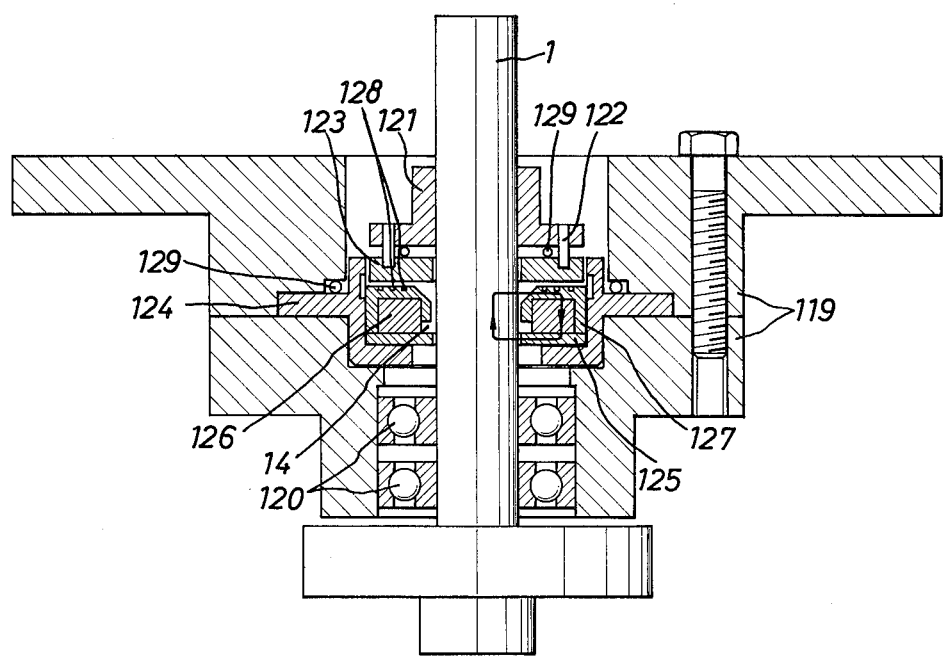
FIG. 30 is a sectional view of the last embodiment of the present invention.

FIG. 30 shows the last embodiment of this invention, in which is shown the sealing means having excellent sealing effect in a thrust direction.

A plurality of ball bearings 120 are disposed between the rotary shaft 1 and the casing 119. The rotary shaft 1 is, at its upper part, fixed with a bushing means 121 which supports a magnetic seal ring 123 by way of pins 122. The seal ring 123 is opposing to a seal case 124 incorporated in the casing 119. The seal case 124 is, on its inner side, provided with pole pieces 125, annular magnet 126 and a seal ring 127 made of a non-magnetic substance such as aluminum, plastic or the like. The pole pieces 125 and the non-magnetic seal ring 127 are fixed with the seal case 124. The ferrofluid is retained firmly within the seal case 124.

A plurality of grooves 128 for generating the dynamic pressure of the ferrofluid are formed on one surface of the seal ring 127, but they may also be formed on one surface of the other seal ring 123. Numeral 129 is an O-ring.

According to one aspect of this invention, a magnetic circuit is formed in an arrow direction, and a high pressure is applied to a sealing surface of the grooves for generating the dynamic pressure by attraction of the two opposing seal rings 123 and 127, thereby a desired sealing effect is obtained.

As described above, the sealing means according to the examples disclosed in FIGS. 26 to 30 is a combination of a thrust seal ring, a radial seal ring and a magnet, and utilizes magnetic force binding the ferrofluid, high dynamic pressure by rotation and centrifugal force of the ferrofluid. Accordingly, a very high sealing effect is obtained. Further, it is possible to make a compact sealing unit which can realize the sealing function in a radial and thrust direction.

What is claimed is:

1. Sealing and bearing means for use of ferrofluid comprising:
   a thrust support disc for preventing a thrust movement of a rotary shaft;
   a magnet disc opposing to the thrust support disc, the magnet disc being made of a normal magnet or a plastic-contained magnet;
   either one of the thrust support disc and the magnet disc being fixed with the rotary shaft, the both discs enclosing the rotary shaft concentrically;
   a ferrofluid being retained in a gap formed between opposing surfaces of the thrust support disc and the magnet disc; and
   either one of the thrust support disc and the magnet disc being, at its surface sliding with the other one, provided with grooves for dynamic pressure of the ferrofluid.

2. The sealing and bearing means as claimed in claim 1, wherein reserving grooves for reserving the ferrofluid are formed adjacent the grooves for generating the dynamic pressure of the ferrofluid.

3. The sealing and bearing means as claimed in claim 1, wherein the magnet disc comprises 10 to 70 weight % of magnetic powder and is used for a thrust bearing.

4. The sealing and bearing means as claimed in claim 1, wherein the magnet disc comprises a magnetic powder, 10 to 60 weight % of reinforced fiber such as carbon fiber, glass fiber or the like and a filler such as polytetrafluoroethylene, graphite or the like, the total quantity of the magnetic powder, the reinforced fiber and the filler being no more than 95 weight %.

5. The sealing and bearing means as claimed in claim 1, wherein the magnet disc comprises 90 to 95 weight % of magnetic powder and is used for sealing purposes.

6. The sealing and bearing means as claimed in claim 1, wherein the thrust support disc is engaged with the rotary shaft and pressed resiliently in a thrust direction, while the magnet disc is opposing to the thrust support disc, the ferrofluid being retained between two sliding and opposing surfaces of the thrust support disc and the magnet disc respectively, and the grooves for generating the dynamic pressure of the ferrofluid being formed on either sliding surface of the thrust support disc and the magnet disc.

7. The sealing and bearing means as claimed in claim 6, wherein the thrust support disc is made of a normal magnet or a plastic-contained magnet, while the magnet disc is replaced with a non-magnetic disc.

8. The sealing and bearing means as claimed in claim 6, wherein the magnet disc is, at either one of the outer periphery and inner periphery thereof, provided with grooves for preventing any liquid to be sealed so that it is not penetrated into the grooves for generating the dynamic pressure of the ferrofluid.

9. The sealing and bearing means as claimed in claim 1, wherein the thrust support disc is engaged with the rotary shaft, while two magnet discs spaced from the rotary shaft are opposing to two surfaces of the thrust support disc, the ferrofluid being retained between respective sliding and opposing surfaces of the thrust support disc and the two magnets, and the grooves for generating the dynamic pressure of the ferrofluid being formed on either sliding surface of the thrust support disc and two magnet discs.

* * * * *